(12) United States Patent
Hamamoto et al.

(10) Patent No.: US 11,079,914 B2
(45) Date of Patent: Aug. 3, 2021

(54) NAUTICAL CHART DISPLAY DEVICE, NAUTICAL CHART DISPLAY METHOD, AND NAUTICAL CHART DISPLAY PROGRAM

(71) Applicant: Furuno Electric Co., Ltd., Nishinomiya (JP)

(72) Inventors: Kentaroh Hamamoto, Osaka (JP); Takatoshi Morita, Nishinomiya (JP); Masato Okuda, Kyoto (JP); Takashi Ohmori, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 16/867,712

(22) Filed: May 6, 2020

(65) Prior Publication Data

US 2020/0264762 A1 Aug. 20, 2020

Related U.S. Application Data

(63) Continuation-in-part of application No. PCT/JP2018/041581, filed on Nov. 9, 2018.

(30) Foreign Application Priority Data

Nov. 10, 2017 (JP) .............................. JP2017-216964

(51) Int. Cl.
*G06F 3/0484* (2013.01)
*G01C 21/20* (2006.01)
(Continued)

(52) U.S. Cl.
CPC ....... *G06F 3/04845* (2013.01); *G01C 21/203* (2013.01); *G06T 11/206* (2013.01); *G06T 11/60* (2013.01)

(58) Field of Classification Search
None
See application file for complete search history.

(56) References Cited

U.S. PATENT DOCUMENTS 3,724,079 A * 4/1973 Jasperson .............. G01C 21/22
33/1 SD
2014/0250401 A1 9/2014 Matsumoto et al.
(Continued)

FOREIGN PATENT DOCUMENTS

JP 110282880 A 10/1998
JP 200203154 A 1/2002
(Continued)

*Primary Examiner* — Tuan S Nguyen
(74) *Attorney, Agent, or Firm* — Alleman Hall Creasman & Tuttle LLP

(57) ABSTRACT

The purpose is to provide a nautical chart display device which enables to easily grasp a direction centering on a reference position. The nautical chart display device includes a display, a detector, a directional symbol displaying module, and a directional symbol changing module. The display displays a nautical chart on a screen. The detector detects an operation to the screen. The directional symbol displaying module displays, on the display so as to be superimposed on the nautical chart, a directional symbol in which directional markers arranged in a circle and the center of the circle are indicated. The directional symbol changing module moves the directional symbol according to an operation to the directional symbol.

11 Claims, 9 Drawing Sheets

(51) Int. Cl.
    *G06T 11/20*          (2006.01)
    *G06T 11/60*          (2006.01)

(56)          References Cited

U.S. PATENT DOCUMENTS

2015/0330804 A1*  11/2015  Okuda ............... G01C 21/3664
                                                             701/487
2016/0138932 A1*   5/2016  Ichinokawa ....... G01C 21/3614
                                                             701/454

FOREIGN PATENT DOCUMENTS

JP          2012018538 A     1/2012
WO        2013051051 A1    4/2013

* cited by examiner

NAUTICAL CHART DISPLAY DEVICE, NAUTICAL CHART DISPLAY METHOD, AND NAUTICAL CHART DISPLAY PROGRAM

CROSS-REFERENCE TO RELATED APPLICATION(S)

This application is a continuation-in-part of PCT International Application PCT/JP2018/041581, which was filed on Nov. 9, 2018, and which claims priority to Japanese Patent Application Ser. No. 2017-216964 filed on Nov. 10, 2017, the entire disclosures of each of which are herein incorporated by reference for all purposes.

TECHNICAL FIELD

The present disclosure mainly relates to a nautical chart display device which displays a nautical chart.

BACKGROUND

Patent Document 1 discloses a display device which displays navigational information including a nautical chart. This display device is configured as a touch panel, and executes various processings based on touch operations to a screen.

REFERENCE DOCUMENT OF CONVENTIONAL ART

Patent Document

Patent Document 1: WO2013/051051A1

DESCRIPTION OF THE DISCLOSURE

Problem to be Solved by the Disclosure

Here, in order to grasp a direction centering on a given position (reference position) using a paper nautical chart, a figure called "compass rose" displayed on the nautical chart is used. The compass rose is a figure indicating a direction of the nautical chart. A user can apply a direction indicated by the compass rose to another position, for example, by using two rulers and sliding the ruler while fixing the directions thereof.

The electronic nautical chart as disclosed in Patent Document 1 also has the function to grasp the direction centering on the reference position. However, the operation using the electronic nautical chart may be difficult for a user who is not used to the electronic nautical chart (a user who is used to a method of using the paper nautical chart). Note that this type of problem also exists in a nautical chart display device operated by an operation tool other than the touch panel.

The present disclosure is made in view of the situation described above, and a primary purpose thereof is to provide a nautical chart display device which enables a user to easily grasp a direction centering on a reference position.

SUMMARY

The problem to be solved by the present disclosure is as described above, and measures to solve the problem and effects thereof are described as follows.

According to one aspect of the present disclosure, a nautical chart display device having the following configuration is provided. That is, the nautical chart display device includes a display unit, a detector, a directional symbol displaying module, and a directional symbol changing module. The display unit displays a nautical chart on a screen. The detector detects an operation to the screen. The directional symbol displaying module displays, on the display unit so as to be superimposed on the nautical chart, a directional symbol in which directional markers arranged in a circle and the center of the circle are indicated. The directional symbol changing module moves the directional symbol according to an operation to the directional symbol.

Accordingly, a user can grasp a direction centering on a desired reference position by performing the simple operation of moving the directional symbol to the reference position. Especially, the operation of moving the directional symbol is approximate to an operation of sliding a direction indicated by a compass rose on a paper nautical chart. Therefore, it becomes possible to grasp the direction centering on the reference position in a method which is easily operable even for a user who is used to the paper nautical chart.

MODES FOR CARRYING OUT THE DISCLOSURE

Figure 1:
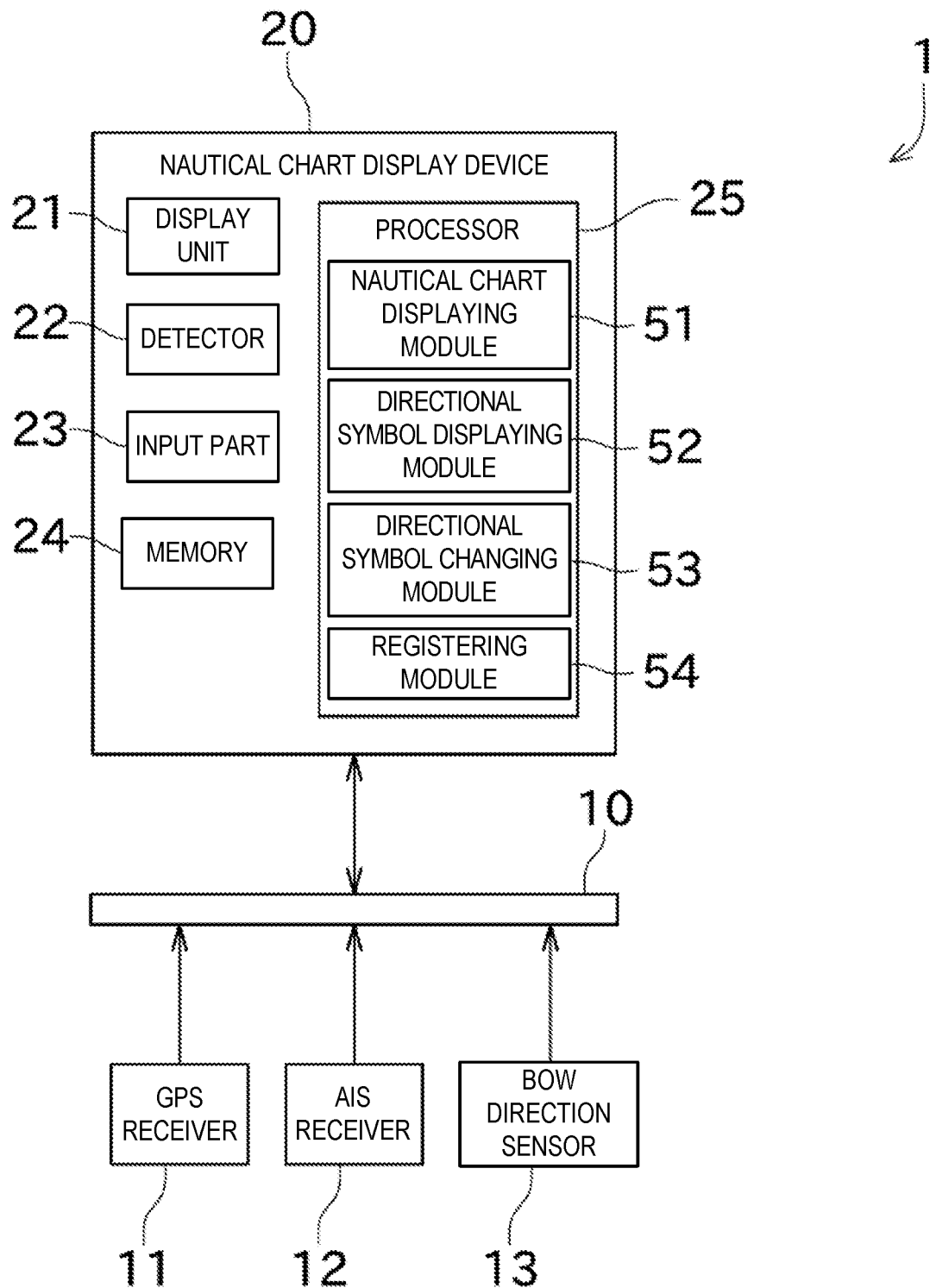
FIG. 1 is a block diagram of an electronic nautical chart displaying network system including a nautical chart display device according to one embodiment of the present disclosure.

Next, one embodiment of the present disclosure will be described with reference to the drawings. First, an electronic nautical chart displaying network system 1 is described with reference to the FIG. 1. FIG. 1 is a block diagram of the electronic nautical chart displaying network system 1 including a nautical chart display device 20 of this embodiment.

The electronic nautical chart displaying network system 1 may be mounted on a ship and configured to display various information required for navigation. As illustrated in FIG. 1, the electronic nautical chart displaying network system 1 may include a GPS receiver 11, an AIS receiver 12, a bow direction sensor 13, and the nautical chart display device 20. Moreover, each of the marine equipment configuring the electronic nautical chart displaying network system 1 may be connected to each other via a marine network 10.

The marine network 10 may be a network for communication between the marine equipment on the same ship. The respective marine equipment can exchange detected information etc. via the marine network 10. The marine network 10 may be a LAN (Local Area Network), and in detail, Ethernet®, a CAN (Controller Area Network), or NMEA (National Marine Electronics Association) may be used. Note that at least one of the GPS receiver 11, the AIS receiver 12, and the bow direction sensor 13 may be connected directly with the nautical chart display device 20 using a cable etc., without being connected via the marine network 10.

The GPS receiver 11 may receive positioning signals from GPS satellites via GPS antennas (not illustrated). The GPS receiver 11 may acquire a position of the ship (in detail, positions of the GPS antennas, and an absolute position of the ship based on the terrestrial reference) based on the positioning signals, and transmit it to the nautical chart display device 20. Note that, instead of the GPS receiver 11, a receiver for acquiring the position of the ship by using a GNSS other than the GPS (e.g., GLONASS or GALILEO) may be used.

The AIS receiver 12 may receive an AIS signal transmitted from another ship. The AIS (Universal Shipborne Automatic Identification System) is a system which transmits the positional information, the navigational information, etc. of the ship to the surroundings thereof wirelessly. The AIS receiver 12 may receive the AIS signal transmitted from another ship and analyze it to acquire information on an absolute position, a destination, etc. of another ship (AIS information). The AIS receiver 12 may transmit the acquired AIS information to the nautical chart display device 20. The AIS information may include a name, the absolute position, a course, and the destination of another ship. Note that the analysis of the AIS signal may be performed by the nautical chart display device 20.

The bow direction sensor 13 may detect a bow direction of the ship (a direction in which a bow of the ship is directed) as an absolute azimuth based on the terrestrial reference. A magnetic direction sensor, a GPS compass, a gyrocompass, etc. may be used as the bow direction sensor 13. The bow direction sensor 13 may transmit the detected bow direction to the nautical chart display device 20.

The nautical chart display device 20 may be a device for displaying an electronic nautical chart. The nautical chart display device 20 of this embodiment may be a comparatively large in size (e.g., a screen size of 30 inches or larger, or 40 inches or larger), and may be disposed so that a displaying screen becomes parallel with a substantially horizontal direction. Note that the nautical chart display device 20 may have the screen size smaller than 30 inches, or the displaying screen thereof may be disposed at or near vertical.

The "substantially horizontal direction" as used herein may refer to a direction including a plane parallel to a floor surface on which the nautical chart display device 20 is disposed, in addition to a plane perpendicular to the vertical direction. Moreover, the "substantially horizontal direction" as used herein may not strictly be a direction perpendicular to the vertical direction, or parallel to the floor surface, but include a case of having an angle of 10° or less. Also, a case in which an inclination angle of the screen of the nautical chart display device 20 is changeable may correspond to "the nautical chart display device 20 is disposed so that the screen becomes parallel with the substantially horizontal direction," as long as the inclination angle can be changed to direct toward the substantially horizontal direction.

As illustrated in FIG. 1, the nautical chart display device 20 may include a display unit 21, a detector 22, an input part 23, a memory 24, and a processor 25.

The display unit 21 may be a unit having the screen on which electronic data can be displayed by using diagram(s) and character(s). The display unit 21 is, for example, a liquid crystal display, but may be a plasma display, an organic electro-luminescence display, etc. Although in this embodiment the screen of the display unit 21 has a rectangular shape, it may have a different shape, such as a square shape.

The detector 22 may be a touch panel of a capacitance-type etc. disposed on the screen of the display unit 21. The detector 22 may be capable of detecting a touch operation (a touch gesture), which is an operation of a user touching on the screen with his/her finger(s), an operation tool, etc. Note that a hardware key may be disposed in addition to the touch panel. The detector 22 may output an electrical signal corresponding to the user's touch operation (corresponding to a change of a touched point).

The touch operation may include "a drag operation," "a pinching operation," and "a rotating operation," other than the operation of touching one point or a plurality of points. The drag operation may be an operation of moving finger(s) touching the screen in a given direction without the finger(s) being separated from the screen. This drag operation may correspond to processing to scroll the nautical chart. The pinching operation may be an operation of moving two fingers touching the screen, closer to each other (pinch-in operation) or away from each other (pinch-out operation), without the fingers being separated from the screen. This pinching operation may correspond to processing to change a scale of the nautical chart. The rotating operation may be an operation of touching the screen with two fingers and rotating one finger around the other finger (FIG. 7), or an operation of rotating the two fingers touching the screen centering on a center of the two fingers as a rotational center (FIG. 8). This rotating operation may correspond to processing to rotate the nautical chart (to change a direction of the nautical chart with respect to the direction of the screen).

The input part 23 may accept an input of the electrical signal outputted from the detector 22. The input part 23 may receive an input of a signal outputted from an external device of the nautical chart display device 20, in addition to the electrical signal outputted from the detector 22. In detail, the input part 23 may be an input port etc. to which the signal outputted from the detector 22 or the signal outputted from the external device is inputted. The processor 25 may execute processing according to the signal inputted into the input part 23.

The memory 24 may store nautical chart information, point(s) registered by the user, a route created by the user, various programs (e.g., a nautical chart display program), etc. The memory 24 may be a nonvolatile memory, such as a hard disk drive, a flash memory (a flash disk, a memory card, etc.), or an optical disc. The memory 24 may be comprised of one of the hardware described above, or may be comprised of a plurality of the hardware. For example, only the nautical chart information may be stored in the optical disc, and other information may be stored in the hard disk drive.

The processor 25 may be a processing unit such as an FPGA, ASIC, or a CPU. The processor 25 may read the program stored in the memory 24 etc. to a RAM etc., and execute the program to execute various processings related to the nautical chart display device 20. Accordingly, the processor 25 may implement a nautical chart displaying module 51, a directional symbol displaying module 52, a directional symbol changing module 53, and a registering module 54. The nautical chart displaying module 51 may display the nautical chart on the display unit 21. The directional symbol displaying module 52 may display a directional symbol 40 illustrated in FIG. 2. The directional symbol changing module 53 may change a position, a size, a direction, etc. of the directional symbol 40. The registering module 54 may register points, for example, for creating a route according to an instruction (touch operation) by the user.

Figure 2:
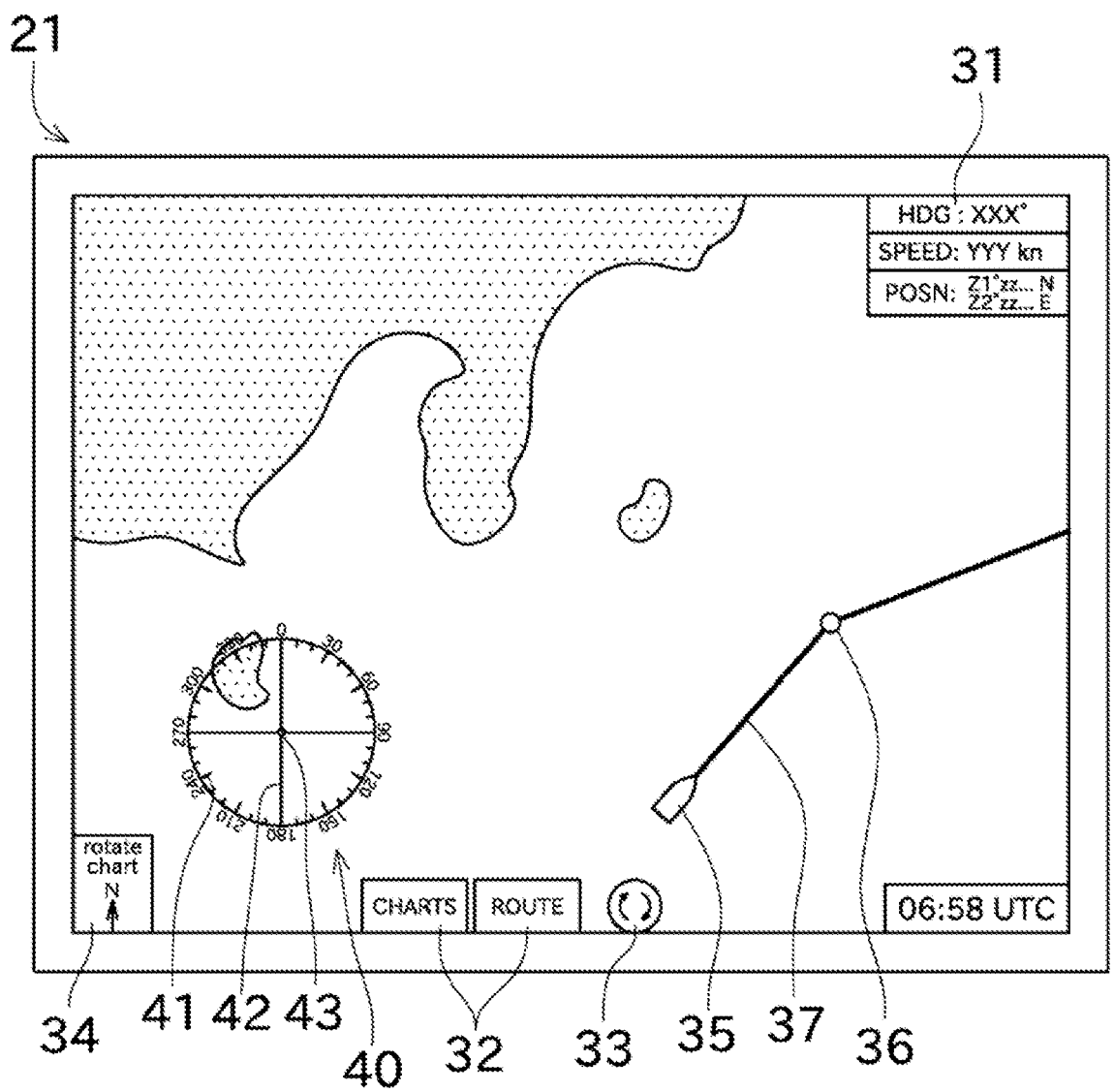
FIG. 2 is a view illustrating a screen displayed on a display unit.
Figure 5:
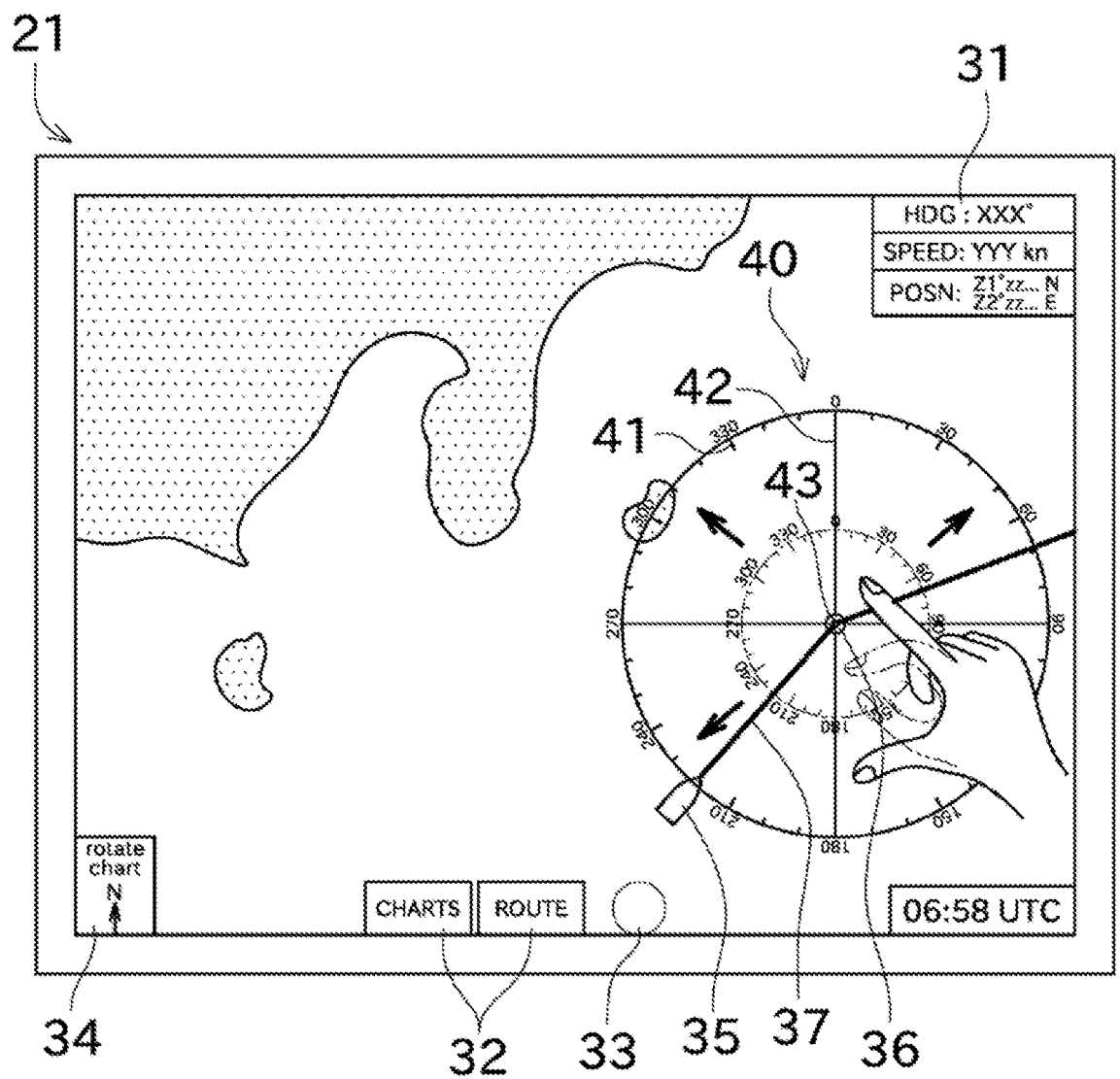
FIG. 5 is a view illustrating a situation in which the directional symbol is increased in size according to a touch operation.

FIG. 2 illustrates a screen displayed on the display unit 21 by the processor 25 executing processing. In FIG. 2, land areas are indicated by dots, and a sea area is indicated by plain color. Moreover, on the screen, basic ship information 31 indicating the position, the bow direction, etc. of the ship by texts, menu buttons 32 for managing the nautical chart, creating the route, etc., a rotation button 33 for setting whether to enable the rotation of the nautical chart, and a nautical chart direction adjustment button 34 for adjusting the direction of the nautical chart, may be displayed so as to be superimposed on the nautical chart. When the rotation button 33 is touched, a state may be switched between a rotation-enabled state (FIG. 2) and a rotation-disabled state (FIG. 5). In the rotation-enabled state, the rotation of the nautical chart by the touch operation may be enabled, while in the rotation-disabled state the rotation of the nautical chart by the touch operation may be disabled. When the nautical chart direction adjustment button 34 is touched, a mode may be switched between a north-up mode in which the nautical chart is displayed with an upper side of the screen being north, a heading-up mode in which the nautical chart is displayed with the upper side of the screen being the bow direction of the ship, and a course-up mode in which the nautical chart is displayed with the upper side of the screen being a course direction.

Moreover, as illustrated in FIG. 2, on the screen of the display unit 21, a ship symbol 35 indicating the position and the bow direction of the ship on the nautical chart, a waypoint 36 which is a point registered by the user in advance and is also a via-point of a route, and a route 37 may be displayed. A position and a direction of the ship symbol 35 being displayed on the screen may be defined so as to correspond to the position acquired by the GPS receiver 11 and the bow direction acquired by the bow direction sensor 13. Moreover, an AIS symbol indicating another ship may be displayed based on the AIS information acquired by the AIS receiver 12.

When the user selects a given menu item and touches the nautical chart, the detector 22 may detect the touched position, and the processor 25 (the registering module 54) may specify the position on the nautical chart associating with the touched position on the screen, and thus the touched point can be registered. Moreover, the route may be created by the user specifying a departure point, a via-point, and a destination point through the touch operation (alternatively by selecting points among those registered in advance). Note that the nautical chart display device 20 is also capable of creating the route by only the departure point and the destination point being set by the user.

Moreover, as illustrated in FIG. 2, the directional symbol 40 may further be displayed on the screen of the display unit 21. The directional symbol 40 may be a display object to indicate the direction of the nautical chart. Although the directional symbol 40 of this embodiment is the display object of a circular shape, it may have a sector shape such as a semicircle, or an arc-like shape. The directional symbol 40 may include directional markers 41, auxiliary lines 42, and a central part 43. A part (pixels) on which the characters or the figures such as the directional markers 41, the auxiliary lines 42, and the central part 43 are displayed may correspond to a drawing area, and a part (pixels) on which the characters or the figures are not displayed may correspond to a non-drawing area.

The directional markers 41 may be markers indicating directions of the nautical chart (true direction in this embodiment). A numerical value indicating a direction of the marker may be provided to some of the markers. The directional markers 41 may be arranged in a circle centering on a given point (central part 43). In other words, the directional markers 41 may be markers indicating directions based on the central part 43 as a reference position. Note that, although the directional markers 41 are arranged throughout a 360-degrees range in this embodiment, the directional markers 41 may be arranged over a central angle (less than 360°) when the directional symbol 40 has a sector shape or an arc shape. The auxiliary lines 42 may be straight lines extending radially from the central part 43 in given directions (in FIG. 2, at intervals of 90° from 0°). Note that the auxiliary lines 42 may be displayed at directional intervals instructed by the user, or may be displayed only in specific directions instructed by the user. Moreover, the directional symbol 40 may not include at least one of the auxiliary lines 42 and the central part 43.

The directional symbol 40 may be superimposed on the nautical chart, and in the entire area of the non-drawing area where the directional markers 41, the auxiliary lines 42 and the central part 43 are not displayed, the nautical chart may be displayed. In detail, in areas between the directional markers 41 and in an area inside a circle created by connecting base-end parts of the directional markers 41, the nautical chart may also be displayed. Accordingly, even when the directional symbol 40 is displayed on the nautical chart, degradation in visibility of the nautical chart can be kept to the minimum. Moreover, whether to display the directional symbol 40 can be switched by a given touch operation, an operation to a button (not illustrated) on the screen, etc. Note that the nautical chart may be displayed in only part of the non-drawing area.

Figure 3:
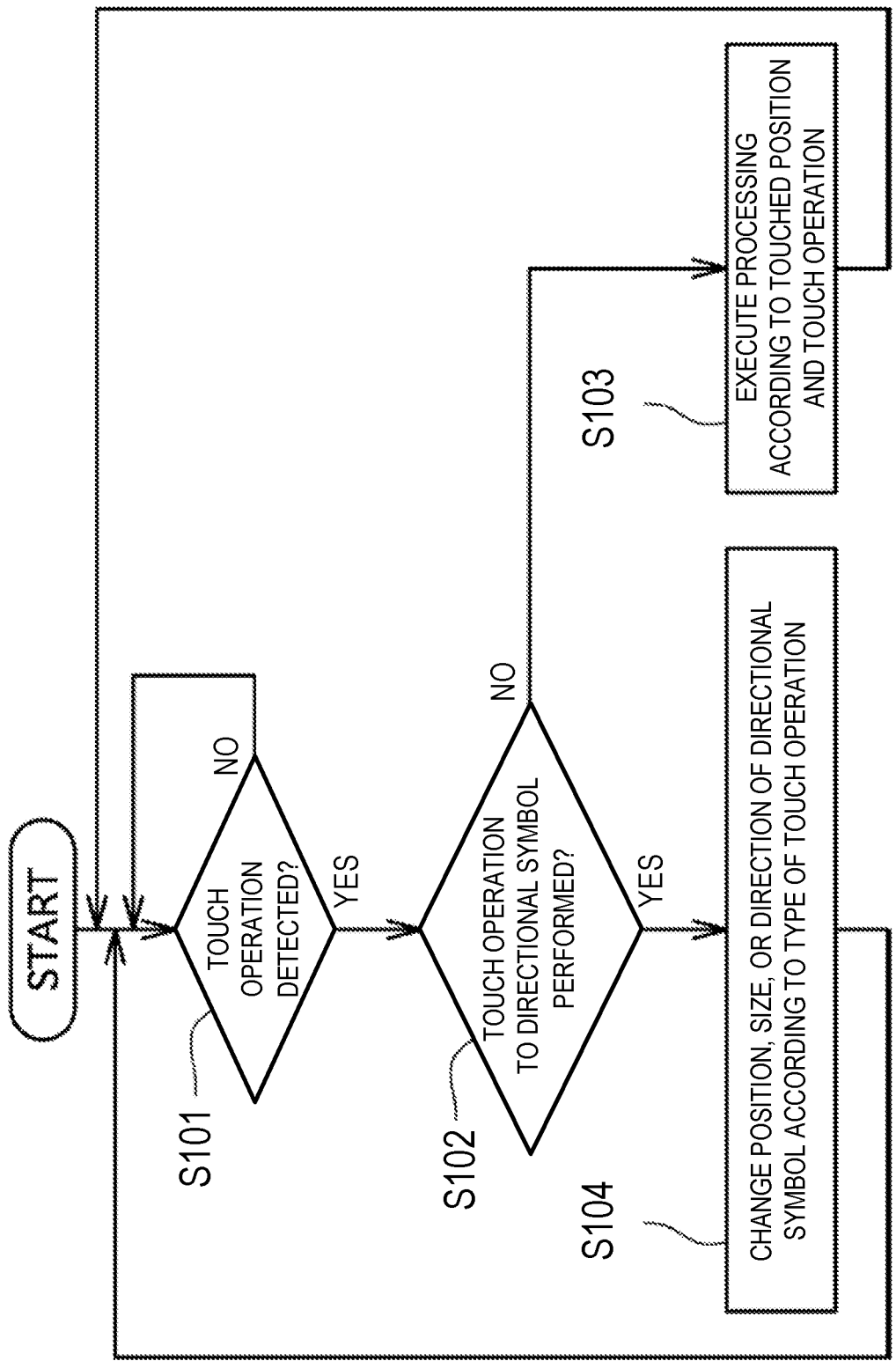
FIG. 3 is a flowchart illustrating processing executed by a processor according to a touch operation detected by a detector.

Next, behavior when the touch operation is performed to the directional symbol 40, and a method for using the directional symbol 40 are described with reference to FIGS. 3 to 7. FIG. 3 is a flowchart illustrating processing executed by the processor 25 according to the touch operation detected by the detector 22. FIGS. 4 to 7 are views illustrating situations in which a position, a size, and a direction of the directional symbol 40 are changed according to the touch operations, respectively. Note that in FIG. 4 and subsequent drawings, past contents (displayed contents, a position of a hand, etc. in the past) are indicated by chain lines, and present contents are indicated by solid lines. Moreover, in order to facilitate understanding of the relationship between the past contents and the present contents, transitions of the displayed contents are indicated by bold arrows.

As illustrated in FIG. 3, when the processor 25 determines that the touch operation to the screen is detected (Step S101), it may compare the touched position and a position where the directional symbol 40 is displayed so as to determine whether the touch operation to the directional symbol 40 is performed (Step S102). In this embodiment, the touch operation to the directional symbol 40 may mean a touch operation to the inside of the circle created by connecting the base-end parts of the directional markers 41.

When the processor 25 determines that the touch operation is performed to a part of the screen other than the directional symbol 40 (Step S102: NO), it may execute processing according to the touched position and the touch operation (Step S103). For example, when the menu button 32 etc. is touched, the processor 25 may execute processing according to the touched menu button 32. Further, when a pinching operation is performed to the nautical chart, the processor 25 may change the scale of the nautical chart. On the other hand, when the processor 25 (the directional symbol changing module 53) determines that the touch operation is performed to the directional symbol 40 (Step S102: YES), it may change the position, the size, or the direction of the directional symbol 40 according to the type of the touch operation (Step S104). Details are described below.

Figure 4:
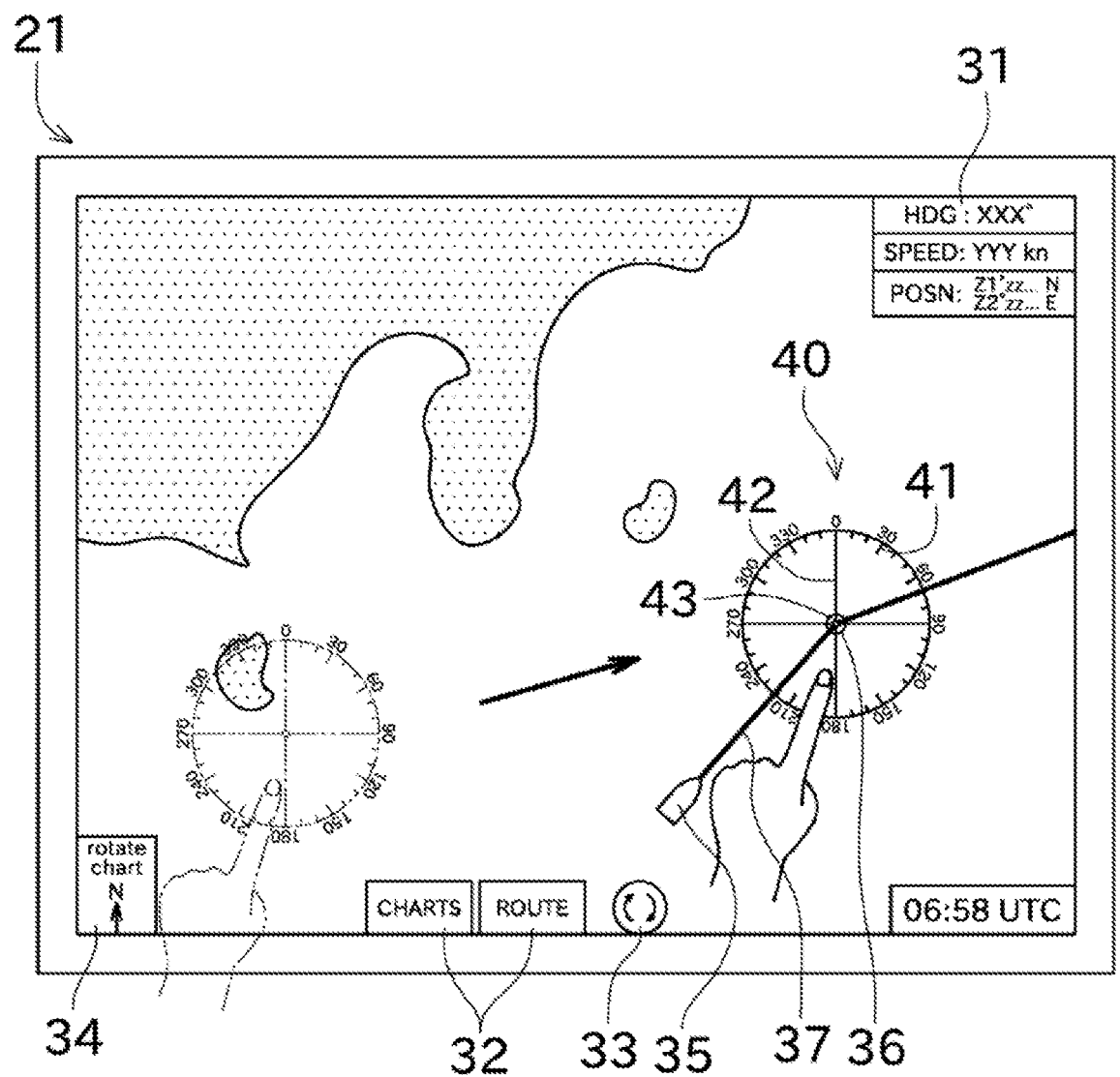
FIG. 4 is a view illustrating a situation in which a directional symbol is moved according to a touch operation.

When the processor 25 determines that the drag operation described above is performed to the directional symbol 40, as illustrated in FIG. 4, it may move the directional symbol 40 according to a length and a direction of the drag operation. At this time, the processor 25 may move only the directional symbol 40 and may not move (not scroll) the nautical chart. Note that, when the drag operation is performed in an area where the directional symbol 40 is not displayed (where the nautical chart is displayed), the nautical chart may be moved (scrolled). In this case, the processor 25 may move the directional symbol 40 in conjunction with the nautical chart (maintain a positional relationship between the nautical chart and the directional symbol 40), or may not move the directional symbol 40 with respect to the nautical chart (maintain a positional relationship between the screen and the directional symbol 40).

When the directional symbol 40 is moved, and the waypoint 36 and the central part 43 are close to each other as illustrated in FIG. 4 (e.g., when a distance therebetween is below a given number of pixels), the directional symbol 40 may be moved so that the positions of the waypoint 36 and the central part 43 are accurately matched.

The directional symbol 40 is used, for example, to confirm the course to reach the next waypoint 36 from one waypoint 36. Therefore, when the central part 43 locates in the vicinity of the waypoint 36, by the positions of the central part 43 and the waypoint 36 being matched as described in this embodiment, the course can be confirmed easily and accurately. Moreover, the directional symbol 40 may be used to confirm what landmark (e.g., a lighthouse) exists in which direction when the ship arrives at the waypoint 36. Also in this use, the landmark can be confirmed easily and accurately by the positions of the waypoint 36 and the central part 43 being matched.

Moreover, the directional symbol 40 can be displayed or moved even during the creation of the route. Therefore, for example, in a situation where the user specifies a first waypoint 36 and then specifies a second waypoint 36, by the directional symbol 40 being superimposed on the first waypoint 36, the user can specify the second waypoint 36 while confirming a course to reach the second waypoint 36.

When the processor 25 determines that the pinching operation described above is performed to the directional symbol 40, as illustrated in FIG. 5, it may change the size of the directional symbol 40 according to which of the pinch-in operation and the pinch-out operation is performed and an operation length of the pinching operation. At this time, the size of the directional symbol 40 may be changed centering on the central part 43. Note that, when the pinching operation is performed to the area where the directional symbol 40 is not displayed (where the nautical chart is displayed), the scale of the nautical chart may be changed centering on a middle point of two positions touched for the pinching operation.

The size of the directional symbol 40 may be changed so that the direction centering on the reference position can be confirmed in various distances. For example, in FIG. 5, while a direction of a small island when seen from the waypoint 36 cannot be grasped accurately with the directional symbol 40 of the chain line (before increasing the size), the direction of the small island when seen from the waypoint 36 (approximately 300°) can be grasped accurately with the directional symbol 40 of the solid line (after increasing the size). Note that in the example illustrated in FIG. 5, the rotation button 33 indicates the rotation-disabled state. By performing the pinching operation to the directional symbol 40 in the state where the rotation of the nautical chart is prohibited in this way, the change in the direction of the nautical chart at the moment of starting the pinching operation can be prevented.

Figure 6:
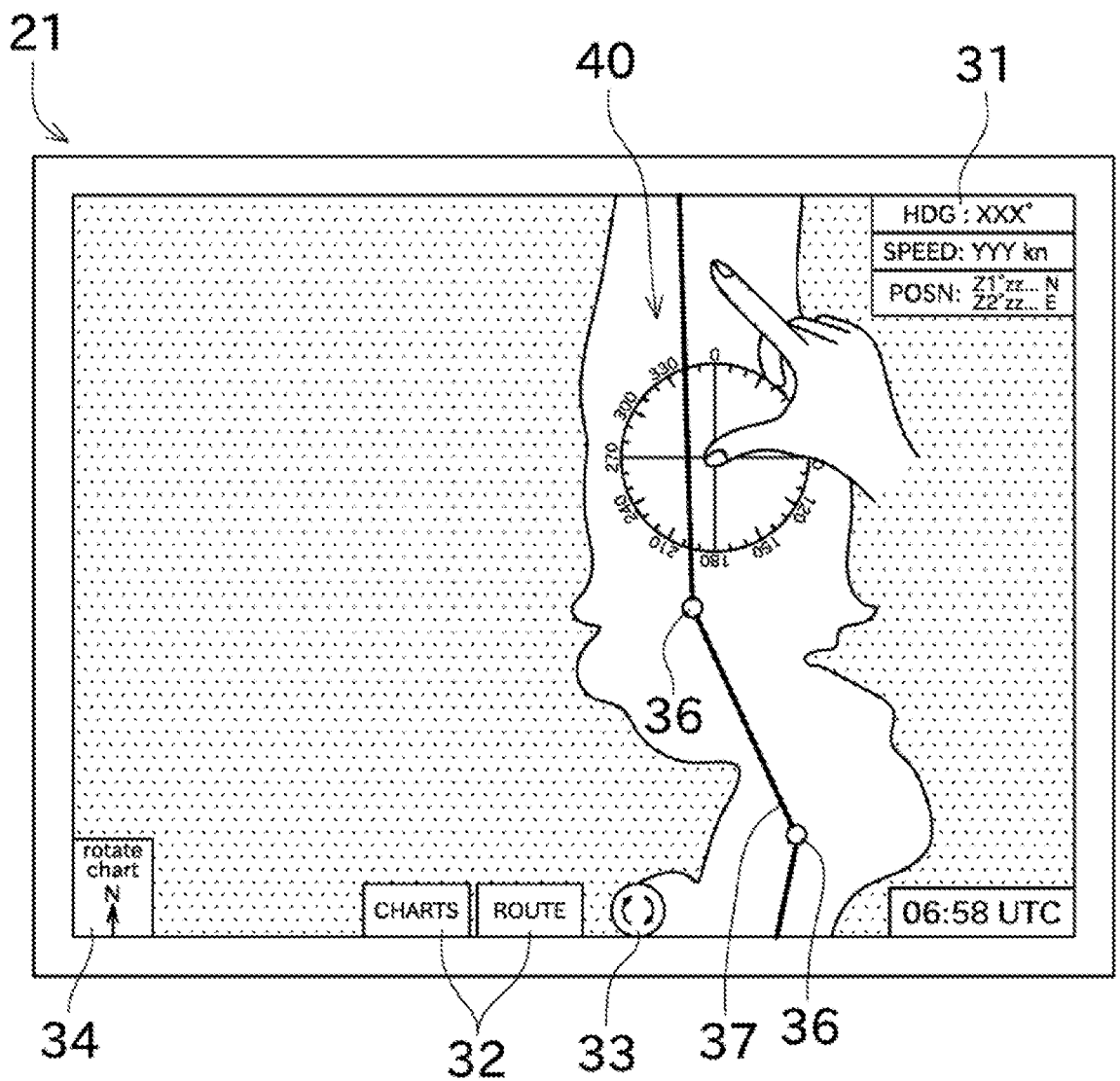
FIG. 6 is a view illustrating a situation before the directional symbol and a nautical chart are rotated according to a touch operation.
Figure 7:
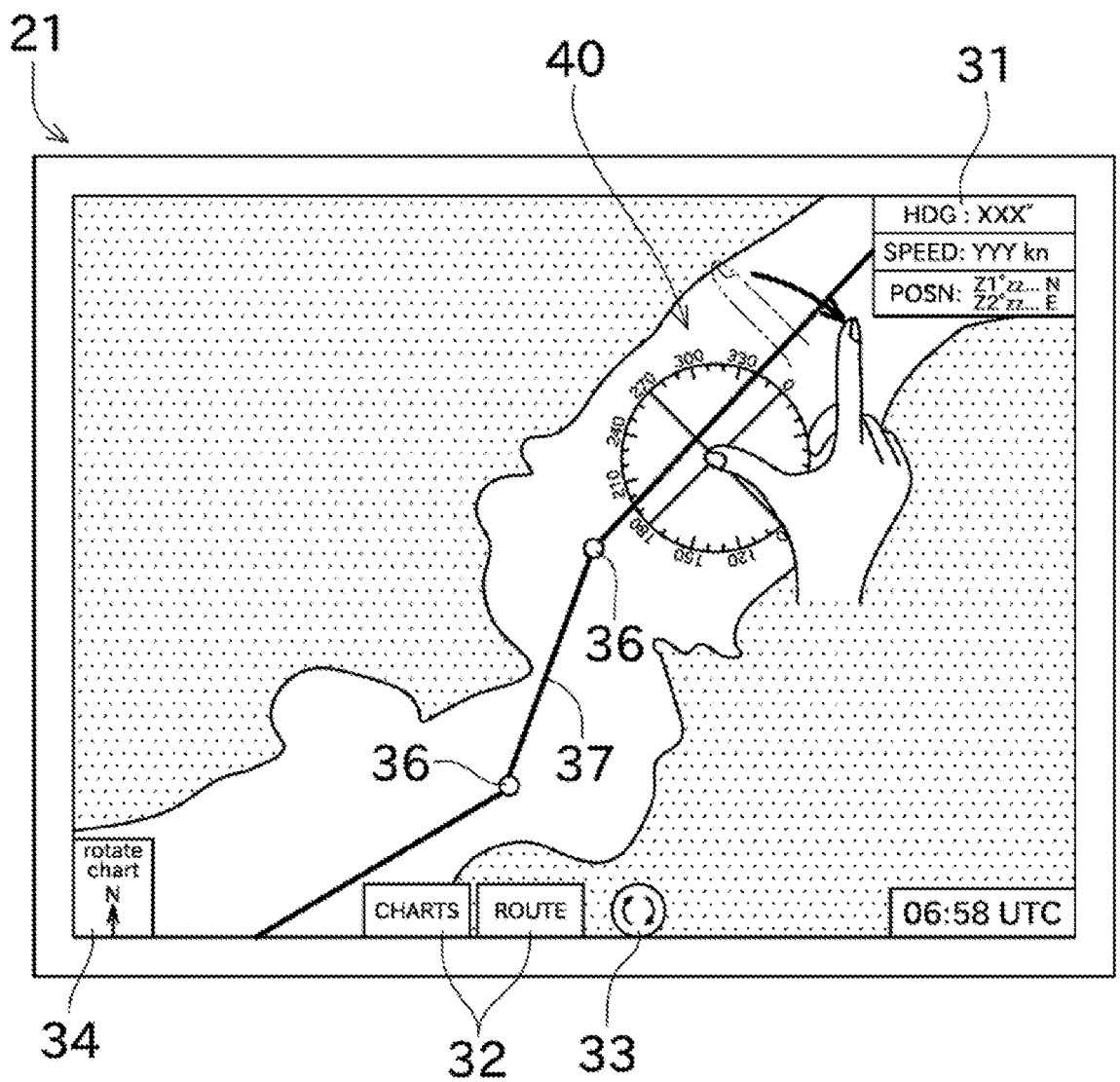
FIG. 7 is a view illustrating a situation after the directional symbol and the nautical chart are rotated according to the touch operation.
Figure 8:
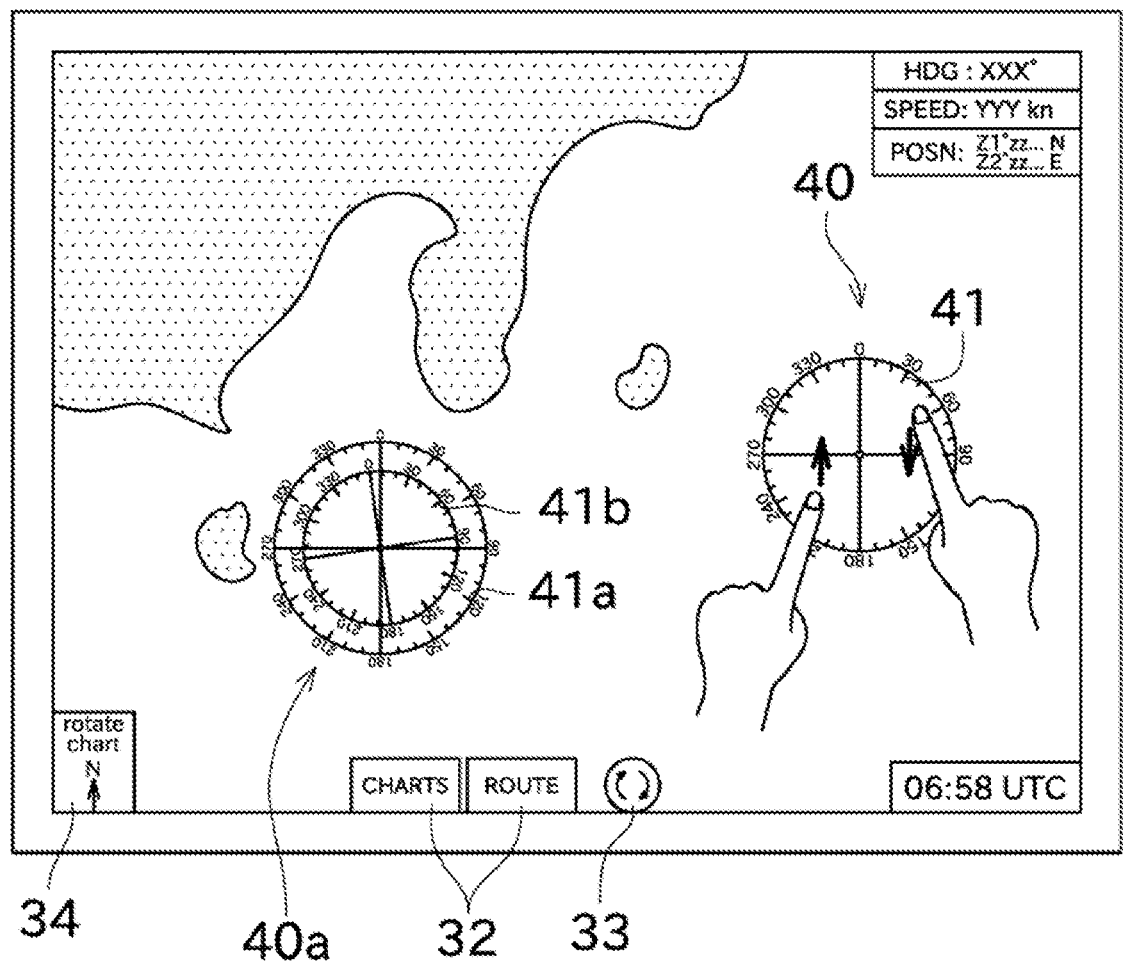
FIG. 8 is a view illustrating a screen in which a plurality of directional symbols and a directional symbol including magnetic directions are displayed.

When the processor 25 determines that the rotating operation described above is performed to the directional symbol 40, as illustrated in FIGS. 6 and 7, it may change the directions of the directional symbol 40 and the nautical chart according to the rotational angle of the rotating operation. At this time, the directions of the directional symbol 40 and the nautical chart may be changed centering on the central part 43 of the directional symbol 40 regardless of the type of the operation among the two types of the rotating operations described above. Note that, when the rotating operation is performed to the area where the directional symbol 40 is not displayed (where the nautical chart is displayed), the directional symbol 40 and the nautical chart may be rotated centering on a point at which the rotating operation is performed (in the case of rotating two fingers, a middle point of the two positions touched by the fingers, and in the case of rotating one finger centering on the other finger, the position touched by the other finger).

Moreover, when rotating the directional symbol 40 and the nautical chart, the directional symbol 40 and the nautical chart do not rotate after the completion of the touch operation (rotating operation) by the user, but may rotate in real time even during the touch operation. Therefore, the user can perform a fine adjustment to bring the rotational angles of the directional symbol 40 and the nautical chart to a desired angle while checking the rotational angles thereof. By rotating the nautical chart in this way, a screen area can be sufficiently utilized.

For example as illustrated in FIGS. 6 and 7, when creating a route along a water area surrounded by land areas and elongated in the north and south direction, only a length corresponding to a short side of the rectangular screen can be used in the north-up mode described above. Therefore, as illustrated in FIG. 7, by rotating the directional symbol 40 and the nautical chart to set the route by utilizing a length corresponding to a diagonal of the rectangular screen, a length of the route which can be displayed on one screen without the scale being decreased may become longer. By rotating the directional symbol 40 and the nautical chart, the screen area can sufficiently be utilized as described above. Note that the screen area can sufficiently be utilized likewise also when a route along a river, a waterway, etc. is created. Moreover, after the completion of the creation of the route, by operating the nautical chart direction adjustment button 34, the north-up mode etc. can be restored.

Figure 9:
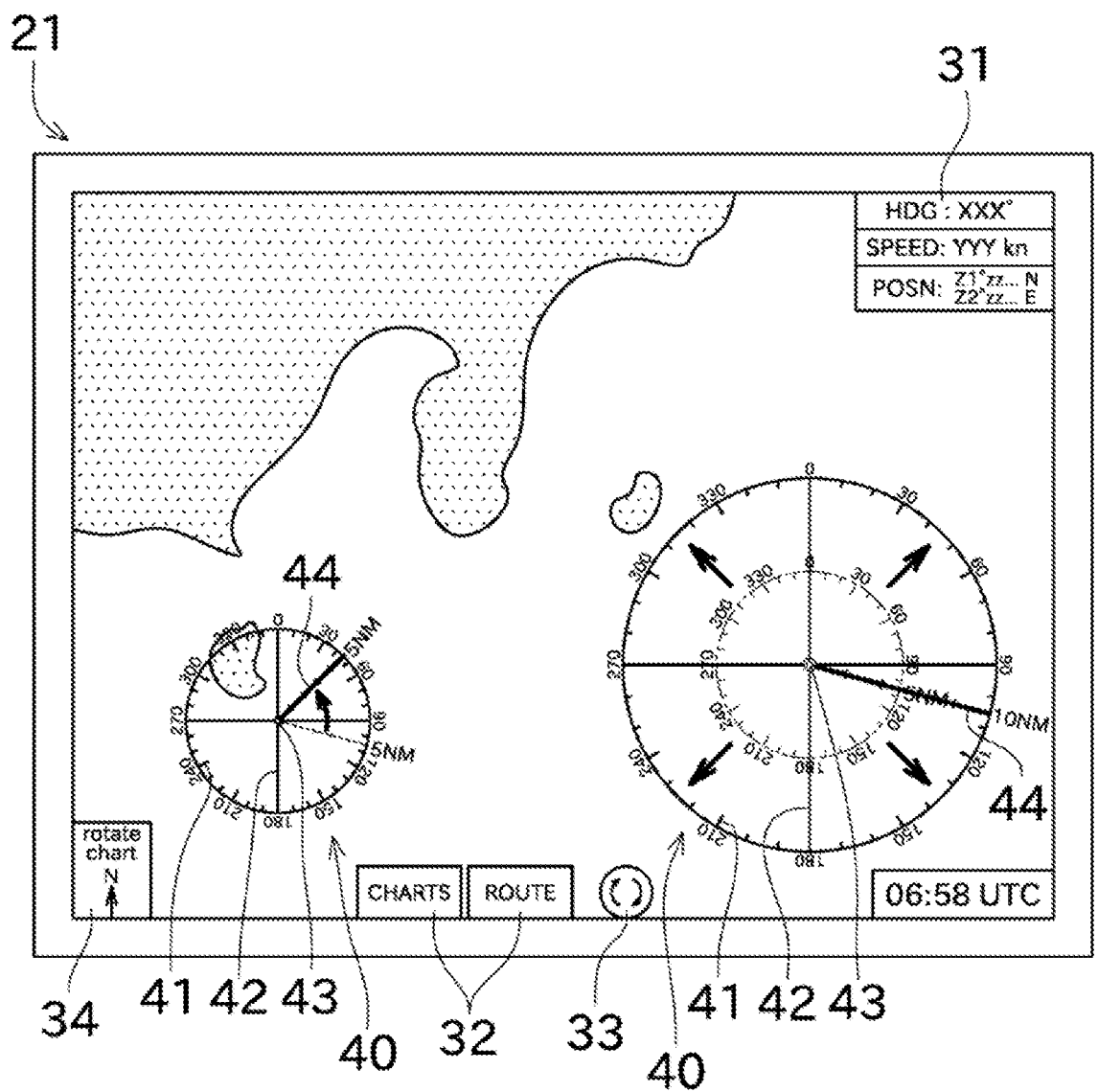
FIG. 9 is a view illustrating a screen in which a directional symbol including a distance scale line is displayed, and a situation in which the distance scale line is rotated or increased in size.

Next, other functions of the nautical chart display device 20 of this embodiment are described referring to FIGS. 8 and 9. FIG. 8 is a view illustrating a screen in which a plurality of directional symbols 40 and a directional symbol 40 including magnetic directions are displayed.

As illustrated in FIG. 8, the user can display the plurality of directional symbols 40 on the screen of the display unit 21 by performing a given operation to the nautical chart display device 20. The user can perform operations of moving, increasing and decreasing in size, rotating, etc. to the two directional symbols 40, independently. Moreover, the directional symbols 40 can be hidden independently.

Moreover, the user can display a directional symbol 40a in which the magnetic direction is displayed in addition to the true direction, by performing a given operation to the nautical chart display device 20. While the true direction indicates a direction based on meridians, the magnetic direction indicates a direction based on geomagnetism (magnetic poles). In the directional symbol 40a, true directional markers 41a of outer side may indicate the true directions, and magnetic directional markers 41b of inner side may indicate the magnetic directions. The magnetic direction may have a characteristic that it changes according to the position. The processor 25 may calculate a deviation which is a difference between the magnetic direction and the true direction according to the position at which the directional symbol 40 is displayed so as to display the magnetic directional markers 41b according to the position based on the calculation result.

FIG. 9 is a view illustrating a screen on which a directional symbol 40 including a distance scale line 44 is displayed, and a situation in which the distance scale line 44 is rotated or increased in size. The directional symbol 40 in FIG. 9 may include the distance scale line 44 in addition to the directional markers 41 etc. The distance scale line 44 may be a display object for indicating a distance on the nautical chart. In detail, the distance scale line 44 may include a line extending radially outwardly from the central part 43, markers dividing this line at a constant interval, a numerical value illustrated in the vicinity of the other end of this line, etc. This numerical value may indicate the distance on the nautical chart from one end (central part 43) to the other end (intersecting point with the circular display object) of this line. Note that the numerical value indicating the distance on the nautical chart may not be displayed in the vicinity of the other end of the line, but in the vicinity of each of the markers dividing the line.

Moreover, the distance scale line 44 may be configured so that a numerical value is illustrated in the vicinity of the auxiliary lines 42, etc.

The distance scale line 44 may be configured to be rotatable, and increasable and decreasable in size. In detail, as illustrated in the directional symbol 40 on the left side of FIG. 9, the distance scale line 44 can be rotated centering on the central part 43 as a rotational center by performing a given touch operation to the distance scale line 44. This touch operation is, for example, a drag operation to the distance scale line 44. Alternatively, the circular display object may be touched so that the distance scale line 44 is displayed from the central part 43 to the touched position.

When the rotation of the distance scale line 44 is instructed, the distance scale line 44 may rotate independently from the directional markers 41 and the nautical chart (i.e., without the rotation of the directional markers 41 and the nautical chart). Therefore, the distance in a desired direction can be measured without the direction of the nautical chart being changed. Note that, instead of this configuration, the directional markers 41, the distance scale line 44, the nautical chart, etc. may be rotated integrally.

On the right side of FIG. 9, a situation in which the size of the directional symbol 40 is increased and the size of the distance scale line 44 is increased accordingly is illustrated. On the right side of FIG. 9, since a radius of the directional symbol 40 is increased to double, the numerical value included in the distance scale line 44 may also be changed to double (from 5 NM to 10 NM). Note that, when the scale of the nautical chart is changed, the numerical value may also be changed accordingly.

The distance scale line 44 may be displayed constantly, or may be switched between the displayed state and a non-displayed state by a given operation. Moreover, a plurality of distance scale lines 44 may be included in one directional symbol 44.

In the above description, the nautical chart display device 20 may include the touch panel, and the user may provide the instructions by the touch operation to the screen. The operation to the screen may be performed by using an operation tool such as a mouse, a trackball, etc. (in detail, by moving a pointer etc. displayed on the screen, selecting a given position on the screen, etc.) in addition or alternative to the touch panel. In this case, the detector 22 may output an electronic signal according to the operation performed by using the mouse, the trackball, etc. Moreover, as an operation to scroll the nautical chart or an operation to move the directional symbol 40, the pointer may be moved while a given key (e.g., a left button of the mouse) being pressed. Moreover, as an operation to increase or decrease the size of the nautical chart, the directional symbol 40, etc., a wheel button is rotated for example. Moreover, as an operation to rotate the nautical chart, the directional symbol 40, etc., for example, the pointer may be moved parallelly or rotationally while a key different from that described above being pressed. Note that these are examples of the operations, and different operations may be assigned.

As described above, the nautical chart display device 20 of this embodiment may include the display unit 21, the detector 22, the directional symbol displaying module 52, and the directional symbol changing module 53, and a nautical chart display method may be performed by executing the nautical chart display program. The display unit 21 may display the nautical chart on the screen. The detector 22 may detect the operation to the screen. The directional symbol displaying module 52 may display, on the display unit 21 so as to be superimposed on the nautical chart, the directional symbol 40 in which the directional markers are arranged in a circle and the center thereof is indicated. The directional symbol changing module 53 may move the directional symbol 40 according to the operation to the directional symbol 40 (change the position of the directional symbol 40).

Therefore, the user can grasp the direction centering on the desired reference position by performing the simple operation of moving the directional symbol 40 to the reference position. Especially, the operation of moving the directional symbol 40 may be approximate to the operation of sliding the direction indicated by the compass rose on the paper nautical chart. Therefore, it becomes possible to grasp the direction centering on the reference position in a method which is easily operable even for the user who is used to the paper nautical chart.

In the nautical chart display device 20 of this embodiment, the directional symbol changing module 53 may rotate the nautical chart along with the directional symbol 40 (change the directions of the directional symbol 40 and the nautical chart) centering on the center of the directional symbol 40 (central part 43) as a rotational center according to the operation to the directional symbol 40.

Accordingly, by the user rotating the directional symbol 40 and the nautical chart on the basis of the desired position, the user can rotate the nautical chart so that he/she can easily see the nautical chart, and so that the focusing area matches the size of the screen.

In the nautical chart display device 20 of this embodiment, the directional symbol changing module 53 may increase or decrease size of the directional symbol 40 (changes the size of the directional symbol 40) according to the operation to the directional symbol 40.

Accordingly, by the user changing the size of the directional symbol 40, he/she can easily grasp the direction in the desired distance centering on the reference position.

In the nautical chart display device 20 of this embodiment, the directional symbol 40 may include the distance scale line 44 extending from the center of the circle (central part 43). The numerical value indicating the distance may be illustrated on the distance scale line 44. The directional symbol changing module 53 may change the numerical value of the distance scale line 44 indicating the distance according to the scale of the nautical chart or the increase or the decrease in size of the directional symbol 40.

Accordingly, by the distance scale line 44 being displayed, the user can intuitively grasp not only the direction but also the distance. Furthermore, even when the directional symbol 40 is increased or decreased in size, the user can intuitively grasp the distance on the nautical chart.

In the nautical chart display device 20 of this embodiment, the directional symbol 40 may include the distance scale line 44 extending from the center of the circle (central part 43). The directional symbol changing module 53 may rotate the distance scale line 44 centering on the center of the circle (central part 43) as a rotational center.

Accordingly, by the distance scale line 44 being matched with the position to which the user want to measure the distance, the user can measure the distance in the desired direction.

In the nautical chart display device 20 of this embodiment, the directional symbol 40 may include the drawing area in which the characters or the figures including at least the directional markers 41 are displayed, and the non-drawing area in which the characters or the figures are not displayed. The nautical chart may be displayed at least in a part of the non-drawing area.

Accordingly, the area in which the nautical chart is displayed can be secured sufficiently. Especially, since the directional symbol 40 is used for obtaining the direction etc. on the nautical chart, it may be suitable that the nautical chart is displayed in the vicinity of the directional symbol 40.

In the nautical chart display device 20 of this embodiment, the directional symbol displaying module 52 may display the directional symbol 40 which includes the auxiliary lines 42 extending radially from the center of the circle in the given directions or in the specified directions.

Accordingly, the user can easily grasp the direction from the reference position.

The nautical chart display device 20 of this embodiment may include the registering module 54 which registers the point (waypoint 36) according to the inputted instruction. When the directional symbol 40 is moved according to the operation, and it is instructed to move the directional symbol 40 to the vicinity of the registered point, the directional symbol changing module 53 may match the registered point with the center of the directional symbol 40 (central part 43).

Accordingly, the user can accurately grasp the direction based on the registered point as the reference position.

In the nautical chart display device 20 of this embodiment, the directional symbol displaying module 52 may display the directional symbol 40 including both of the true directional markers 41a indicating the true directions, and the magnetic directional markers 41b indicating the magnetic directions according to the geographic position.

Accordingly, it is possible to display the contents similar to those of the compass rose on the paper nautical chart. Moreover, an accurate magnetic direction in consideration of the position can be displayed on the nautical chart.

Although the suitable embodiment of the present disclosure is described above, the above configurations may be changed as follows.

Correspondence between the touch operations and the changes in the position, the size and the direction of the directional symbol 40 is one example. For example, the user may touch the directional symbol 40 with a finger and separate the finger therefrom, and then the directional symbol 40 may be moved to a position where the user touches again with the finger (i.e., after the touched position to the directional symbol 40 is detected, it may become undetected without the directional symbol 40 being dragged, and the directional symbol 40 may be moved to the point where another touched position is detected).

The flowchart of FIG. 3 is one example, and the order of the processings may be changed, a part of the processings may be omitted, or another processing may be added.

Although the nautical chart display device 20 according to the embodiment described above is disposed so that the screen thereof becomes parallel to the substantially horizontal plane, it may be disposed at a different angle.

Although in the embodiment described above, the present disclosure is applied to the nautical chart display device which mainly displays the electronic nautical chart, the present disclosure can also be applied to a display device capable of displaying a radar image, an image from a fish finder, etc. in addition to the electronic nautical chart.

The invention claimed is:

1. A nautical chart display device, comprising:
a display configured to display a nautical chart on a screen;
a detector configured to detect an operation to the screen; and
processing circuitry configured
to display, on the display so as to be superimposed on the nautical chart, a directional symbol in which directional markers arranged in a circle and the center of the circle are indicated; and
to move the directional symbol according to an operation to the directional symbol, wherein
the processing circuitry increases or decreases in size of the directional symbol according to the operation to the directional symbol,
the directional symbol includes a distance scale line extending from the center of the circle,
a numerical value indicating a distance is illustrated on the distance scale line, and
the processing circuitry changes the numerical value of the distance scale line indicating the distance according to a scale of the nautical chart or the increase or the decrease in size of the directional symbol.

2. The nautical chart display device of claim 1, wherein the processing circuitry rotates the nautical chart along with the directional symbol centering on the center of the directional symbol as a rotational center according to the operation to the directional symbol.

3. The nautical chart display device of claim 2,
wherein the processing circuitry rotates the distance scale line centering on the center of the circle as a rotational center.

4. The nautical chart display device of claim 2, wherein the directional symbol includes a drawing area in which characters or figures including at least the directional markers are displayed, and a non-drawing area in which the characters or the figures are not displayed, and at least in a part of the non-drawing area, the nautical chart is displayed.

5. The nautical chart display device of claim 1,
wherein the processing circuitry rotates the distance scale line centering on the center of the circle as a rotational center.

6. The nautical chart display device of claim 1, wherein the directional symbol includes a drawing area in which characters or figures including at least the directional markers are displayed, and a non-drawing area in which the characters or the figures are not displayed, and at least in a part of the non-drawing area, the nautical chart is displayed.

7. The nautical chart display device of claim 1, wherein the processing circuitry displays the directional symbol including auxiliary lines extending radially from the center of the circle in given directions or in specified directions from the detector.

8. The nautical chart display device of claim 1, the processing circuitry is further configured to register a point according to an inputted instruction from the detector,
wherein when the processing circuitry moves the directional symbol according to the operation, and the inputted instruction is given to move the directional symbol to the vicinity of the registered point, processing circuitry matches the registered point with the center of the directional symbol.

9. The nautical chart display device of claim 1, wherein the processing circuitry displays the directional symbol including both of true directional markers indicating true directions, and magnetic directional markers indicating magnetic directions according to a geographic position.

10. A method of displaying a nautical chart, comprising the steps of:
displaying, on a display so as to be superimposed on a nautical chart, a directional symbol in which directional markers arranged in a circle and the center of the circle are indicated, the directional symbol including a distance scale line extending from the center of the circle, a numerical value indicating a distance being illustrated on the distance scale line;
detecting an operation to the directional symbol on a screen of the display, and moving the directional symbol according to the operation;
increasing or decreasing in size the directional symbol according to the operation to the directional symbol; and
changing the numerical value of the distance scale line indicating the distance according to a scale of the nautical chart or the increasing or the decreasing in size of the directional symbol.

11. A non-transitory computer-readable recording medium storing a control program causing a processor of a nautical chart display device to execute processing, the processor configured to control operation of the device, the processing comprising:
displaying, on a display so as to be superimposed on a nautical chart, a directional symbol in which directional markers arranged in a circle and the center of the circle are indicated, the directional symbol including a distance scale line extending from the center of the circle, a numerical value indicating a distance being illustrated on the distance scale line;
detecting an operation to the directional symbol on a screen of the display, and moving the directional symbol according to the operation;
increasing or decreasing in size the directional symbol according to the operation to the directional symbol; and
changing the numerical value of the distance scale line indicating the distance according to a scale of the nautical chart or the increasing or the decreasing in size of the directional symbol.

* * * * *